TELEPHONE DIALLING INDICATOR

Filed July 10, 1961 2 Sheets-Sheet 1

INVENTOR
EDWARD VICTOR NEWBERY
BY
Kurzbeken, Fuschsteim + Offlinger
ATTORNEYS

Oct. 15, 1963 E. V. NEWBERY 3,107,278

TELEPHONE DIALLING INDICATOR

Filed July 10, 1961 2 Sheets-Sheet 2

INVENTOR
EDWARD VICTOR NEWBERY
BY Kirschstein, Kirschstein & Ottinger
ATTORNEYS 3,107,278
TELEPHONE DIALLING INDICATOR
Edward Victor Newbery, Coventry, England, assignor to The General Electric Company Limited, London, England
Filed July 10, 1961, Ser. No. 122,685
Claims priority, application Great Britain July 12, 1960
13 Claims. (Cl. 179—90)

The invention relates to telephone sets of the kind that have a dial. In particular the invention is concerned with telephone dials themselves and with indicator apparatus for use with telephone sets of the kind having a dial.

A frequent cause of the establishment of wrong connections in automatic telephony is incorrect dialling, and this applies particularly where a large number of digits is to be dialled. With subscriber trunk dialling a subscriber may be required to dial eleven or twelve digits in order to establish a connection to a wanted subscriber, and this number is likely to increase to as many as seventeen with the eventual extension of trunk dialling to international working. Even if the digits of a wanted subscriber's designation are written down by the calling subscriber and followed while he dials, it is easy for him to forget which of the digits he should dial next, or to repeat or omit a digit. These errors obviously contribute greatly to the establishment of wrong connections.

It is one object of the present invention to provide indicator apparatus for use with a telephone set of the kind that has a dial, which may be used to help reduce the above-mentioned errors.

Another object of the present invention is to provide a telephone dial which may be used to help reduce dialling errors.

According to one aspect of the present invention indicator apparatus for use with a telephone set of the kind that has a dial, comprises means for carrying a representation of the sequence of digits of a designation to be dialled, an index that is arranged for movement relative to said means so as to indicate the digits of the represented designation in turn, and means adapted to be actuated as a consequence of dialling of each of a succession of digits so as to effect relative movement between the index and the first-mentioned means from a position in which the index serves to indicate one of the represented digits to a position in which it serves to indicate the next represented digit.

The indicator apparatus is preferably easily attachable to a standard form of telephone set without requiring that set to be unduly modified. The indicator apparatus may be arranged for attachment to the centre of the dial, and may include a lever which is deflected, for example by the finger-stop of the dial, as a consequence of dialling, so as to step the index on.

According to another aspect of the present invention a telephone dial includes means for carrying a representation of the sequence of digits of a designation to be dialled, an index that is arranged for movement relative to said means so as to indicate the digits of the represented designation in turn, and means that is arranged to be actuated as a consequence of dialling of each of a succession of digits so as to effect relative movement between the index and the first-mentioned means from a position in which the index serves to indicate one of the represented digits to a position in which it serves to indicate the next represented digit.

The dial may include a pivoted lever that is arranged to be deflected about its pivot as a consequence of dialling of any digit, and a ratchet and pawl mechanism that is responsive to deflection of the lever about the pivot to step the index on from one to the next of the positions in which the index serves to indicate the represented digits respectively. The lever may be carried by a finger-plate of the dial and may be arranged to strike an abutment member of the dial, so as to be deflected about the pivot, during movement of the finger-plate as a consequence of dialling of any digit. The lever may be spring-biased to adopt either of two positions about the pivot and may be arranged to strike the abutment member twice as a consequence of the dialling of each digit, a first occasion during movement of the finger-plate from its rest position and a second occasion during return movement of the finger-plate to the rest position, the arrangement being such that when the lever strikes the abutment member on said first occasion the lever is deflected from a first of said two positions so as to adopt the second position and on said second occasion is deflected from the second position to adopt said first position. The said abutment member, which may be the finger-stop of the dial, may be arranged to restrain the lever from pivotal movement when the finger-plate is in its rest position.

The indicator apparatus and the dial in accordance with the present invention may both be used to help reduce errors in dialling, the index of each automatically indicating the digits of the designation in turn as the successive digits are dialled. Thus by ensuring that the index indicates the first digit to be dialled before he starts to dial, the calling subscriber is then automatically provided with a visual indication of the next digit he is to dial, throughout the whole dialling process. The index may be arranged for rotary motion, and its movement from indicating one digit to indicating the next digit may take place as a result of either the forward or backward movement of the finger-plate of the dial during dialling.

The said means for carrying a representation of the digits to be dialled in the indicator apparatus, or telephone dial, may be an element upon which the sequence of digits of the designation may be written by the calling subscriber and subsequently erased. Alternatively this said means may be a member which is adapted to receive and temporarily retain an element, such as a card, upon which the digits are already entered on an intentionally more permanent basis.

Indicator apparatus in accordance with the present invention, as incorporated in a dial of a telephone set, will now be described, by way of example, with reference to the accompanying drawings, in which.

Figures 1, 3, 4:
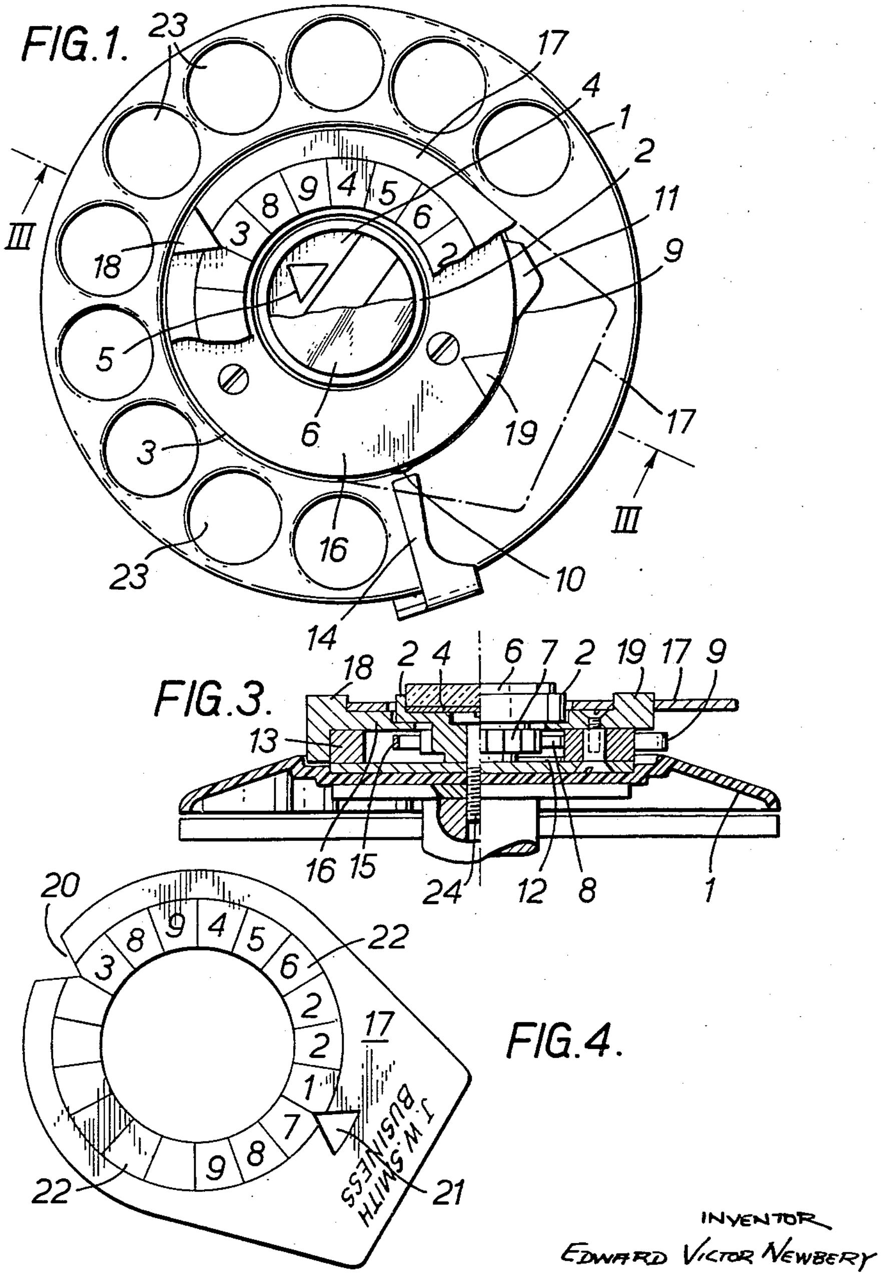
FIGURE 1 is a plan view of a dial incorporating indicator apparatus in accordance with the present invention.
FIGURE 3 is a sectional side-elevation of the dial taken on the line III—III of FIGURE 1.
FIGURE 4 is a plan view of a card, which card bears a representation of a designation that is to be dialled, for use with the indicator apparatus of FIGURES 1 to 3.
Figure 2:
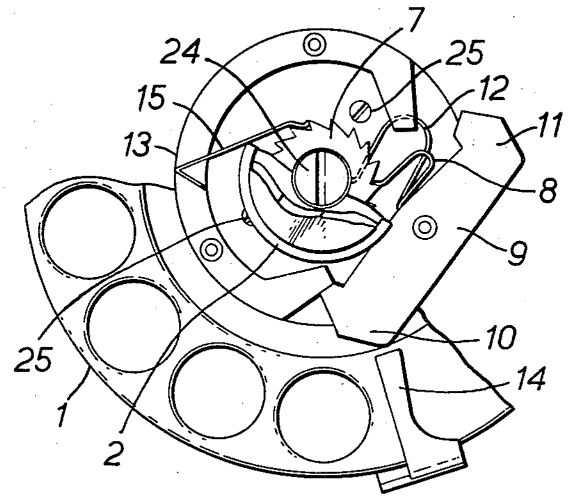
FIGURE 2 is a further plan view, partly broken-away, of the dial shown in FIGURE 1, with a cover-plate of the indicator apparatus removed.

Referring to FIGURES 1 to 3, a finger-plate 1 of the telephone dial carries at its centre a rotatable knob 2, and a ratchet and pawl mechanism 3 for rotating the knob 2 in steps relative to the finger-plate 1 in response to successive rotations of the finger-plate 1. The knob 2 carries a cardboard disc 4 that is marked with an arrowhead index 5 and is visible through a transparent disc 6.

The mechanism 3 includes a ratchet wheel 7 that is carried by the knob 2 and is engaged by a strip metal pawl 8. The pawl 8 is carried by a centrally-pivoted lever 9 that has two ends 10 and 11 respectively, that project, one more than the other, across the blank portion of the finger-plate 1. In the normal rest position (as shown) of the finger-plate 1 the pawl 8 is disengaged from the ratchet wheel 7, the lever 9 in these circumstances being biased by a wire spring 12 into abutment at its end 10 with an arcuate shoulder 13. Pivotal movement of the lever 9 is restrained by a finger-stop 14 of the dial that provides an abutment for the end 10 of the lever 9 in this position of the finger-plate 1.

Rotation of the knob 2 is restricted to distinct steps by a strip metal pawl 15 that is retained by the shoulder 13 and engages with the ratchet wheel 7. The ratchet wheel 7 has eighteen teeth, and in consequence there are eighteen distinct positions of the knob 2 relative to the finger-plate 1.

A top cover-plate 16 of the mechanism 3 is adapted to carry a card 17 that bears a representation of a sequence of digits to be dialled. The card 17 is shown in more detail in FIGURE 4. Two upstanding lugs 18 and 19 on the cover-plate 16 serve to locate the card 17 correctly on the dial, the card 17 having a V-shaped recess 20 for engaging with the lug 18 and a triangular aperture 21 for engaging with the lug 19. The card 17 is marked-off in eighteen sections 22 that are arranged to surround the knob 2 and to correspond to the eighteen possible settings respectively of the index 5 on the knob 2. The successive digits of the sequence to be dialled (in the example shown, 389456221789) are entered upon the card 17 in successive sections 22 in a clockwise direction around the card 17 starting from the recess 20. The name of the subscriber having this designation (in the example shown, J. W. Smith), and whether or not this is a business (as in the example shown) or private telephone designation, is also entered on the card 17. The private and business designations may be entered on opposite faces of the same card (or, if space allows, on the same face).

The subscriber keeps a file of cards such as the card 17, which bear the designations that he most commonly dials, together with a stock of blank cards upon which he may enter new designations for addition to the file. The cards may be filed-away for example in a partitioned wallet (not shown) that fits into a drawer at the base of the telephone set.

When the subscriber wishes to make a call he places the appropriate card, the card 17, upon the coverplate 16, with the recess 20 and the aperture 21 correctly engaged with the lugs 18 and 19 respectively, and then rotates the knob 2 so that the index 5 points to the first digit (in this example, the digit 3) of the designation entered on the card 17. He then proceeds with the dialling of the first digit in the normal manner by inserting his finger in the relevant one of ten finger-holes 23 of the finger-plate 1, rotating the finger-plate 1 in the clockwise direction until his dialling finger strikes the finger-stop 14, and then releasing the finger-plate 1 so that it returns to its normal position. During the clockwise rotation of the finger-plate 1 by the subscriber the end 11 of the lever 9 strikes the finger-stop 14, and since there is at this time no restriction upon pivotal movement of the lever 9 (the end 10 of the lever 9 then being clear of the finger-stop 14) the lever 9 pivots clear of the finger-stop 14 and is urged by the spring 12 into abutment at the end 11 with the shoulder 13. The pivotal movement of the lever 9 brings the pawl 8 into engagement with the ratchet wheel 7 to rotate the wheel 7 one step onwards in the clockwise direction against the restraint of the pawl 15. During the return motion of the finger-plate 1 after its release, the end 10 of the lever 9, which then projects across the blank portion of the dial more than the end 11, strikes the finger-stop 14. As a result the lever 9 pivots back so as to adopt its normal position under the action of the spring 12 with the end 10 abutting the shoulder 13.

The clockwise rotation of the knob 2 that occurs with the stepping-on of the ratchet wheel 7 during the dialling of the first digit, brings the index 5 opposite the second digit (in the example the digit 8) of the sequence on the card 17. Thus when the finger-plate 1 has returned to its normal position after the dialling of the first digit, the index 5 points to the next digit to be dialled. The dialling of the indicated digit results in a further stepping-on of the ratchet wheel 7 so that the index 5 points to the next, the third, digit of the sequence on the card 17. The dialling of this digit and of each subsequent digit results in a stepping-on of the index 5 to point to the remaining digits of the sequence in turn. The subscriber is thus automatically provided with a visual indication of the next digit he is to dial thoughout the whole dialling process.

The indicator apparatus comprising the mechanism 3 and the knob 2 may be provided as part of the dial, or alternatively may be provided as an accessory for attachment to a standard construction of dial. In this latter connection, the mechanism 3 as shown in FIGURE 3 is such that it can readily be attached to a dial of British Post Office standard construction (as shown) without incurring modification of the dial other than the removal of the normal instruction card from the centre of the finger-plate 1, and replacement of the normal centre screw by a longer cheese-headed screw 24 (FIGURES 2 and 3) and the two normal finger-plate securing screws by longer screws 25 (FIGURE 2). If the indicator apparatus is to be attached to a dial of other construction, a special plate for "converting" the finger-plate fixing arrangement of the dial to that of the British Post Office standard construction, may be used between the mechanism 3 and the finger plate.

Although in the indicator apparatus of FIGURES 1 to 3, the digits of the designation to be dialled are borne by the card 17, these digits may alternatively be written on the cover-plate 16 with, for example, an ordinary pencil so that they can be erased after the call. In this latter case the cover-plate 16 is preferably provided with an upper surface of white plastic and is marked-off in sections corresponding to the sections 22 of the card 17 so as to facilitate the entry of the digits thereon.

I claim:

1. A telephone dial including a dial finger-plate for rotation in the dialling of digits, means for carrying a representation of the sequence of digits of a designation to be dialled, an index for movement relative to said means to indicate the digits of the represented designation in turn, and mechanical means mounted on the finger-plate and responsive to the dialling of each of a succession of digits to effect relative movement between the index and the first-mentioned means from a position in which the index serves to indicate one of the represented digits to a position in which it serves to indicate the next represented digit, said mechanical means including a pivoted lever carried by the finger-plate to pivot relative to the finger-plate in consequence of the dialling of any digit, and means responsive to pivotal movement of the lever relative to the finger-plate to effect said relative movement between the index and said first-mentioned means.

2. A telephone dial according to claim 1 wherein an abutment member is mounted to be struck by said lever on rotation of the finger-plate during the dialing of any digit, and said lever is arranged to be deflected about its pivot relative to the finger-plate on striking the abutment member.

3. A telephone dial according to claim 2 wherein the lever is spring-biased to adopt either of two positions about the pivot and is arranged to strike the abutment member twice as a consequence of the dialling of each digit, a first occasion during movement of the finger-plate from its rest position and a second occasion during return movement of the finger-plate to the rest position, the arrangement being such that when the lever strikes the abutment member on said first occasion the lever is deflected from a first of said two positions so as to adopt the second position and on said second occasion is deflected from the second position to adopt said first position.

4. A telephone dial according to claim 2 wherein the abutment member is arranged to restrain the lever from pivotal movement when the finger-plate is in its rest position.

5. A telephone dial according to claim 2 wherein said abutment member is a finger-stop of the dial.

6. A telephone dial according to claim 1 wherein the index is rotatably mounted centrally of the dial.

7. A telephone dial according to claim 1 wherein the means responsive to pivotal movement of the lever is a ratchet and pawl mechanism.

8. A telephone dial including a dial finger-plate for rotation in the dialling of digits, means for carrying a representation of the sequence of digits of a designation to be dialled, an index mounted centrally of the finger-plate for rotational movement relative to the carrying means to indicate the digits of the represented designation in turn, a ratchet wheel mounted coaxially with the index, and a pawl which together with the ratchet wheel forms a pawl and ratchet mechanism connected between the index and the finger-plate so that when the finger-plate is rotated to dial any digit there is rotational movement of the index relative to said carrying means from a position in which the index serves to indicate one of the represented digits to a position in which it serves to indicate the next represented digit.

9. A telephone dial including a dial finger-plate for rotation in the dialing of digits, a finger-stop for limiting finger-rotation of the finger-plate during dialling, means for carrying a representation of the sequence of digits of a designation to be dialled, an index mounted centrally of the finger-plate for rotational movement relative to the carrying means to indicate the digits of the represented designations in turn, a pivoted lever carried by the finger-plate to strike the finger-stop and in consequence pivot relative to the finger-plate when the finger plate is rotated to dial any digit, and a mechanism responsive to pivotal movement of said lever relative to the finger-plate to effect rotational movement of the index relative to said carrying means from a position in which the index serves to indicate one of the represented digits to a position in which it serves to indicate the next represented digit.

10. A telephone dial according to claim 9 wherein the index is carried by a knob rotatably mounted centrally of the finger-plate, and the mechanism comprises a ratchet wheel carried by said knob, and a pawl carried by said lever to engage and rotate said ratchel wheel in response to pivotal movement in one direction of the lever.

11. A telephone dial according to claim 10 wherein a further pawl carried by the finger-plate engages with the ratchet wheel to restrict rotation of the wheel to distinct steps.

12. Indicator apparatus for use with a telephone set having a dial, comprising a member adapted for attachment centrally of the dial and for carrying a representation of the sequence of digits of a designation to be dialled, an index mounted for rotation relative to said member to indicate the digits of the represented designation in turn, a lever pivoted intermediate its two ends for pivotal movement with respect to said member between two positions in one of which a first only of the two ends projects outwardly from said member to a substantial degree and in the other of which the second only of the two ends projects outwardly from said member to a substantial degree, and a mechanism responsive to pivotal movement of the lever between said two positions to rotate the index relative to said member.

13. Indicator apparatus for use with a telephone set having a dial, comprising a member adapted for attachment centrally of the dial and for carrying a representation of the sequence of digits of a designation to be dialled, a knob mounted centrally of said member for rotation relative to said member, an index to rotate with the knob to indicate the digits of the represented designation in turn, a ratchet wheel carried by the knob, a lever pivoted intermediate its two ends for pivotal movement with respect to said member between two positions in one of which a first of the two ends projects outwardly from said member more than the second end and in the other of which said second end projects outwardly from said member more than said first, means biasing the lever to adopt selectively one of the two positions, and a pawl carried by said lever to rotate the ratchet wheel a distinct step onwards in response to pivotal movement of the lever in one direction between said two positions.

References Cited in the file of this patent

UNITED STATES PATENTS

| | | |
|---|---|---|
| 2,072,657 | Varley | Mar. 2, 1937 |
| 2,390,357 | Diskin | Dec. 4, 1945 |

FOREIGN PATENTS

| | | |
|---|---|---|
| 253,129 | Switzerland | Nov. 1, 1948 |